March 18, 1952 H. I. SIDES 2,590,048
BASKET CARRYING CARRIAGE
Filed Nov. 1, 1949 3 Sheets-Sheet 3
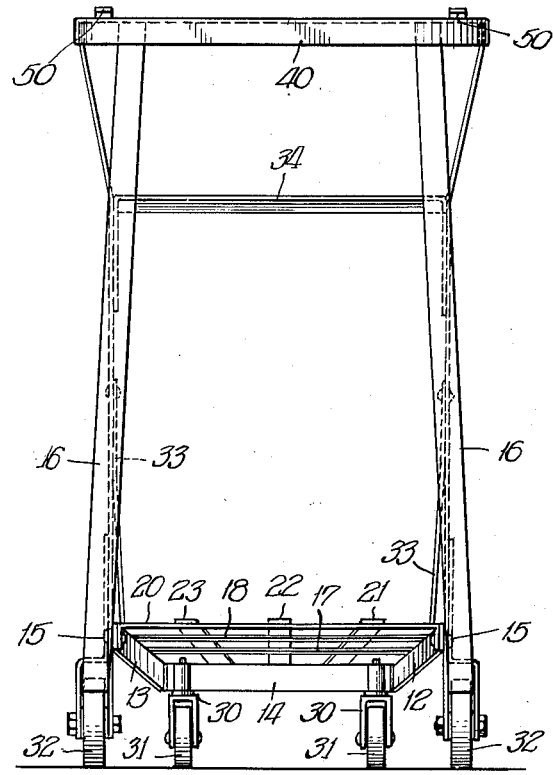
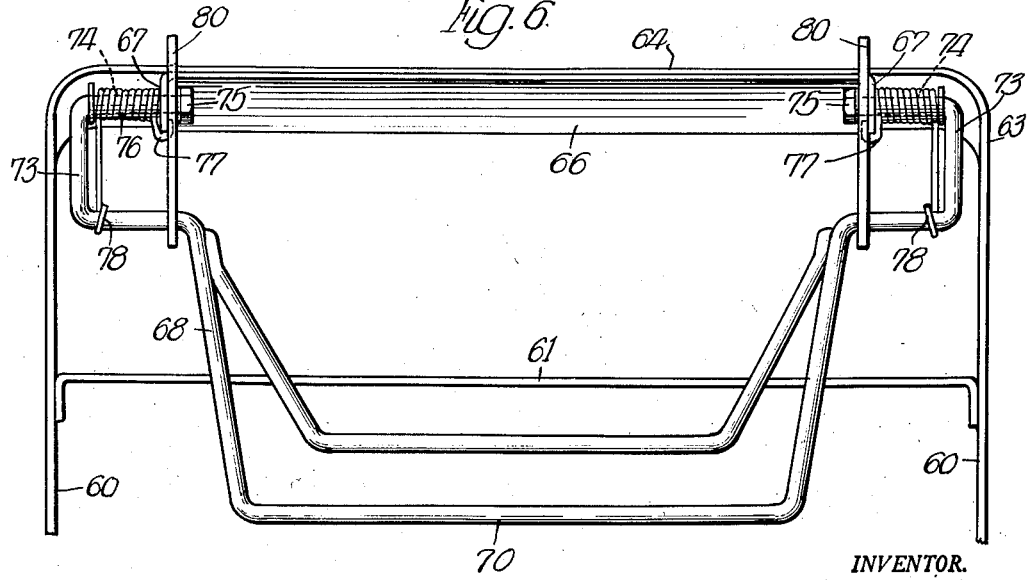
INVENTOR.
Harold I. Sides,
BY
Cromwell, Greist-Warden
ATTYS.

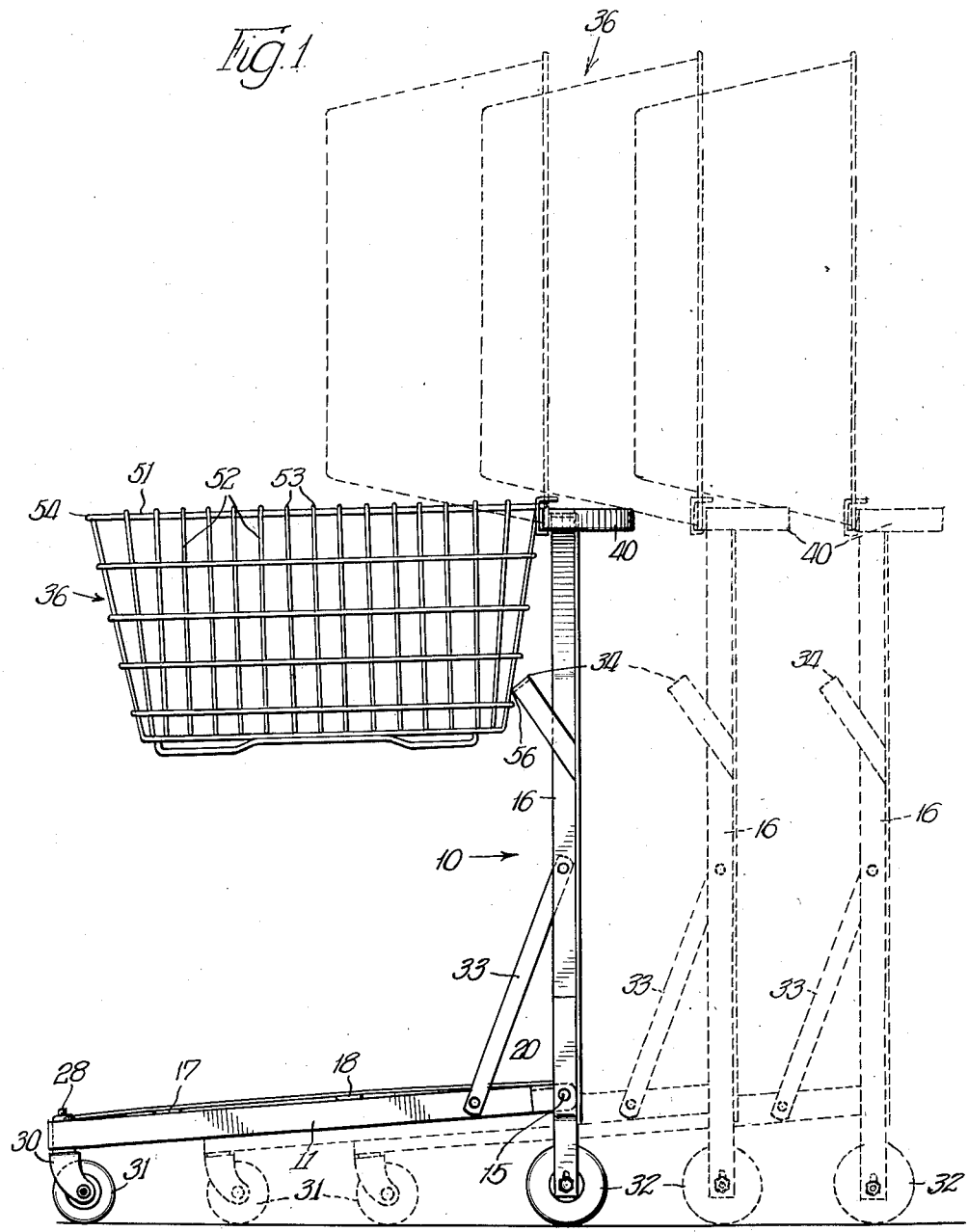

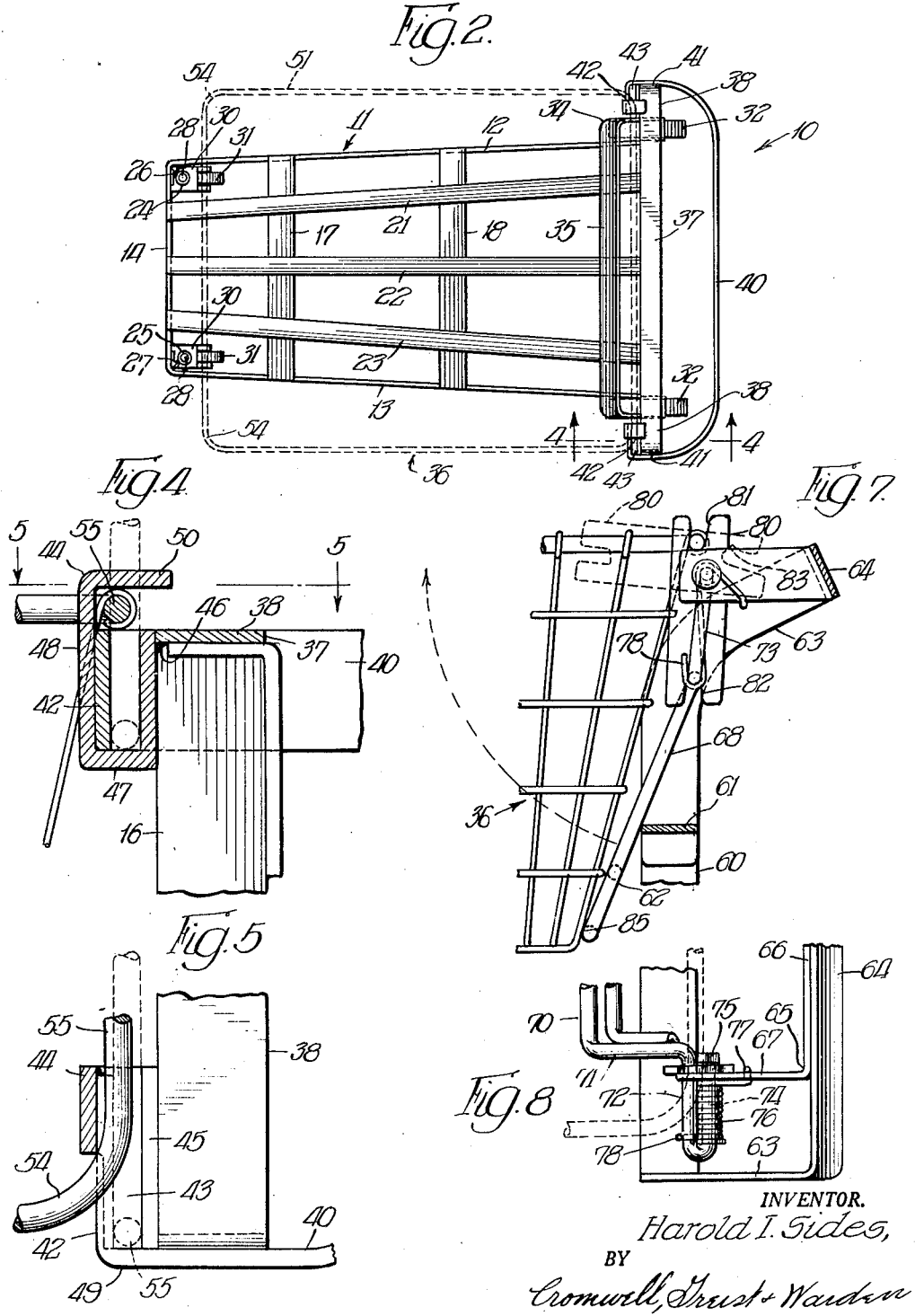

Patented Mar. 18, 1952

2,590,048

UNITED STATES PATENT OFFICE 2,590,048

BASKET CARRYING CARRIAGE

Harold I. Sides, Chicago, Ill.

Application November 1, 1949, Serial No. 124,866

2 Claims. (Cl. 280—50)

This invention relates, generally, to basket-supporting carriages especially suited for use in self-service stores, and it has particular relation to innovations and new and useful improvements in basket-supporting carriages for self-service stores wherein conventional type wire baskets with inwardly sloping sides may be supported on the carriages and may be tilted up when empty so as to permit nesting of the carriages with baskets attached.

An important object of the invention is a basket-supporting carriage or cart for self-service stores to which may be attached a conventional type wire basket having inwardly sloping sides, the basket being supportable in the horizontal position for loading and being tiltable to the upright position when empty.

Another object of the invention is a basket-supporting carriage or cart for use in self-service stores having a basket receiving and retaining attachment which is spring-biased so as to maintain an empty basket in its vertically tilted position when not weighted down by the insertion of goods in the basket so as to cause it to assume the horizontal position.

A further object of the invention is a basket-supporting carriage or cart for self-service stores having a frame base portion which is open at the rear and convergent toward the front and having a basket-supporting connection or attachment on a frame upright portion whereby a wire basket with inwardly sloping sides may be supported either in the horizontal or vertical position, thereby permitting the carts with baskets attached to be nested together so as to occupy reduced space.

Still another important object of the invention is a basket-supporting carriage for self-service stores having a basket-receiving connection whereby a conventional type wire basket with inwardly sloping sides may be attached and detached to and from the carriage, and when attached may readily be placed either in the horizontal goods-receiving position or locked in the vertically tilted empty condition, for nesting.

Another object of the invention is a basket-supporting carriage or cart for self-service stores having a frame which comprises a base portion and an upright basket-supporting portion, the base portion having side members which are convergent and downwardly inclined from front to rear and which carry a downwardly inclined platform whereby the carriages may be nested together.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a side elevational view of a basket-supporting carriage for self-service stores constituting a preferred embodiment of the invention and shown with a basket attached in the horizontal goods-receiving position and having broken lines showing the position of the basket in its empty vertically tilted position with a plurality of the carriages nested together;

Fig. 2 is a top plan view of the carriage shown in Fig. 1 with the basket shown in broken outline in its horizontal goods-receiving position;

Fig. 3 is a rear elevational view of the carriage shown in Fig. 1;

Fig. 4 is an enlarged fragmentary detail sectional view taken on line 4—4 of Fig. 2;

Fig. 5 is a view taken on line 5—5 of Fig. 4;

Fig. 6 is a fragmentary front elevational view of the upper basket-supporting and handle pushing portion of a carriage forming another embodiment of the invention;

Fig. 7 is a side elevational view of the structure shown in Fig. 6 showing a basket attached and in its load-receiving position; and Fig. 8 is a fragmentary top plan view of the structure shown in Fig. 7.

Referring to Figs. 1–3 of the drawings, the reference numeral 10 designates, generally, a basket-supporting carriage or cart for self-service stores (e. g. super markets) which constitutes one embodiment of the present invention. The carriage 10 has a frame which may be fabricated from flat metal stock by welding. The base of the carriage 10 comprises a U-shaped frame member 11 having forwardly convergent side portions 12 and 13 (Fig. 2) interconnected at the front ends by the integral interconnecting portion 14. At their free or rear ends, the side portions 12 and 13 are riveted, as indicated at 15, to a pair of upright or vertical frame members 16—16. The side portions 12 and 13 are maintained in their convergent relationship by means of cross members 17, 18 and 20 in the form of flat pieces or strips which may be welded to the top edges of the side portions 12 and 13. The base of the carriage 10 is further braced and also made into an article-supporting platform by three strips 21, 22 and 23 (Fig. 2) extending from the top edge of the front frame portion 14, rearwardly over the cross pieces 17, 18 and 20.

Caster-receiving sockets 24 and 25 are provided in the front corners of the base of the carriage 10. The sockets 24 and 25 are in the form of tubes or sleeves which are secured to the corners by the mounting brackets 26 and 27 respectively. The posts or stems 28 of casters 30—30 fit in the sockets 24 and 25 and are provided with rollers or wheels 31—31.

The casters 30—30 in the front corners of the base serve to support the front of the carriage 10 and it is supported at the rear by a pair of wheels or rollers 32—32 suitably mounted in known manner on the bottom ends of the vertical frame members 16—16. The rear wheels 32 are aligned in a front to rear direction and are not free to turn around their vertical axes. It will be noted that the rear wheels 32 are somewhat larger than the front wheels 31 and that the base portion of the carriage 10 which includes the frame element 11 is downwardly inclined toward the front of the carriage 10.

The vertical frame members 16—16 at opposite sides of the carriage 10 are braced in their vertical position by brace members 33—33 (Fig. 1). The braces 33 are rigidly connected by rivets or welding at their opposite ends to the vertical frame members 16 and the side portions 12 and 13.

The vertical frame members 16 are braced apart intermediate their upper and lower ends by a forwardly and upwardly inclined U-shaped member 34. The opposite sides of the member 34 are secured at their ends as by welding to the vertical members 16 while the portion 35 which interconnects the ends of the U-member 34 serves as a rest or stop for a basket 36. At their upper ends, the vertical side members 16 are interconnected by a cross member 37 having portions 38—38 which project beyond the members 16. A U-shaped handle member 40 extends in spaced relationship along the rear of the cross member and the forwardly turned end portions are interconnected thereto as indicated at 41—41.

Reference may now be had particularly to Figs. 4 and 5 for a description of the structure whereby the basket 36 may be attached to the carriage 10 and supported either in the horizontal goods-receiving position, as shown in full line in Fig. 1, or in the empty, tilted or vertical position as shown in broken line in Fig. 1. The opposite sides of the U-shaped handle member 40 project forwardly beyond the cross member 37 and have inwardly turned end portions 42—42 (Figs. 2 and 5). The portions 42 are spaced from the front edge of the member 37 as indicated at 43—43. A combination hook and bracket member 44 is provided adjacent the inner end of each of the inwardly turned portions 42 of the handle 40. Each of the elements or members 44 comprises a vertical portion 45 which is secured at its upper edge to the adjacent projecting end portion 38 of the cross member 37. A weld 46 may serve to connect each vertical portion 45 with the adjacent end portion 38. A horizontal bottom portion 47 extends forwardly from the bottom end of the vertical portion 45 and a vertical portion 48 extends integrally from the outer end of the horizontal portion 47. At the upper end of the vertical portion 48 a rearwardly directed portion 50 is formed which is spaced from the top of the projecting end 38 and the top of the vertical portion 45. The members 44 together with end portions 42 form basket corner receiving sockets which are open at the top and open at the inner ends. The portions 42 and 45 form the front and rear wall of each socket. The portion 47 forms the bottom of each socket and the outer end of each socket is closed by the adjacent portion 49 of the handle 40.

Baskets having inwardly sloping sides are adapted to be supported on the carriage 10. The baskets are usually formed of wire and are available in commercial designs and need not be modified in any way for use with the carriage 10. It will be understood that the baskets should have the proper over-all dimensions depending upon the dimensions and size of the carriage 10. The basket 36 shown in Fig. 1 is of a typical commercial design and is formed of wire framework having suitable reinforcing elements. One of the reinforcing elements is in the form of a continuous rectangular frame member 51 (Figs. 1 and 2) which defines the top outline or opening of the basket 36 and over which the upper ends of the vertical wires 52—52 are connected as indicated at 53. Corners of the basket frame element 51 are curved as indicated at 54—54 in Figs. 2 and 5. The spacing of the frame wires comprising the rear wall of the basket 36 is such as to permit the rear portion 55 of the element 51 to hook over the hook portions 50 as shown in Figs. 1 through 5. The basket 36 is thus supported in the horizontal position as shown in full line in Fig. 1 and is in position to receive and support goods which may be loaded thereinto. When so loaded, the basket 36 is in cantilever suspension with the rear wall or side of the basket 36 resting against the front edge of the U-shaped member 34 as indicated at 56 (Fig. 1). The basket 36 is prevented from rotating around or along the edge 56 by the engagement of the rear portion 55 of the basket member 51 with the vertical portion 48 of the members 44 as illustrated in Figs. 4 and 5.

When the basket 36 is empty and it is desired that it be supported in its vertical or tilted position as shown in Fig. 1, it may be rotated around the rear portion 55 of the reinforcing element 51 and the width of the basket 36 is such that it will slide down into the basket corner receiving sockets so that the opposite ends of rear portion 55 rest on the bottom portions 47 of the elements 44 as shown in broken line in Figs. 4 and 5. In this position, the opposite sides of the reinforcing element 51 engage the inwardly turned portions 42 of the handle 40 and prevent the basket 36 from tilting down toward the front of the carriage 10. The basket 36 is prevented from tilting toward the rear by the engagement of the sides of the frame element 51 adjacent the corners 54 with the portions 45 of the elements 44.

The basket 36 may be unlocked from its vertically tilted position by lifting it up so that the rear portion 55 of the element 51 is raised out of the basket corner receiving sockets.

When it is desired to nest a number of the carriages 10 together with the baskets 36 attached thereto, the baskets are tilted up to the vertical position as shown in broken line in Fig. 1 and then the forward end of the base portion of each carriage 10 is inserted into the rear of the carriage in front of it, as illustrated. Thus, the base of one carriage fits in and underneath the base of the next forward carriage while the baskets 36 interfit with each other as shown in Fig. 1.

A modified structure for supporting the baskets 36 in either a horizontal goods-receiving position or in the vertical or upwardly tilted position is shown in Figs. 6 through 8. In these figures only the upper portions of a pair of vertical side frame members 60—60 are shown, it being understood that the base portion of the carriage may, for example, take the form of the base portion of the carriage 10 shown in and described in connection with Figs. 1 through 5. The upright or vertical frame members 60—60 are supported in their spaced apart condition adjacent their upper ends by a cross member 61 which also serves as a rest or stop for a flat frame 62 against which rests the back side of a basket 36. The side members 60 are rearwardly and upwardly curved adjacent their upper ends as indicated at 63 and are interconnected together by the cross piece 64 extending integrally therebetween, and providing a handle for pushing the carriage. A U-shaped member 65 having a rear portion 66 is fitted to the inside of handle 64 with integral side elements 67—67 projecting forwardly and spaced inwardly from the portions 63 of the vertical frame members 60.

The frame 62 is composed of an outside continuous rod 68 having a bottom portion 70, integrally divergent side portions 71—71, outwardly extending horizontal portions 72—72 extending integrally from the upper ends of the portions 71—71, portions 73—73 projecting integrally from outer ends of the portions 72—72 and inwardly projecting portions 74—74 inwardly turned from the upper ends of the portions 73—73. The base portion 70 and side portions 71—71 lie in one plane while the portions 72, 73 and 74 lie in a second plane forming an obtuse angle as shown in Fig. 6. At their inner ends, the inwardly turned end portions 74—74 project through apertures provided therefor in, and adjacent the outer ends of, forwardly projecting sides 67 of the U-member 65. The free ends of the portions 74—74 are threaded and nuts 75 secure them to the U-member 65.

Each of the horizontal end portions 74 is provided with a coil spring 76 with one end of each of the springs 76 having a hook 77 (Figs. 7 and 8) which fits underneath the adjacent side 67 of the U-member 65 while the other end of the spring 76 has a hook 78 which fits around the horizontal portion 72 of the frame 62. The coil springs 76 are so twisted that the end 78 tends to turn or unwind in a clockwise direction as viewed in Fig. 7, thereby tending to rotate the frame 62 around the axes of the horizontal end portions 74.

Link members 80—80 are associated with each of the projecting sides 67 of the U-member 65. Each of the links 80 is provided with notches 81 and 82 at opposite ends thereof and each of the links 80 is provided with an aperture adjacent its upper end, through which projects the horizontal portion 74 of the frame 62. The bottom notches 82 fit over the horizontal portions 72 of the frame 62 as shown in Fig. 6 while the upper notches 81 are free to receive the rear portion 55 of the frame element 51 of the basket 36.

Each of the slots 81 is provided with an offset inner end 83. When the baskets 36 are tilted upwardly in their vertical position with the links 80 turned as shown in broken line in Fig. 7, the rear portion 55 of the basket rests against the top edge of each of the sides 67 of the U-member 65 and the basket is prevented from slipping rearwardly since the rear portion 55 of the same element 51 is locked in the offset end portions 83 of slots 81.

While the springs 76 are sufficiently strong to tilt the empty baskets 36 to the vertical position, the strength of these springs may be such that when an article of small weight is placed in the basket, it will be retained in its horizontal position. For example, an article weighing one pound may be sufficient when placed in the forward end of the basket.

The baskets 36 are easily removed from the supporting structure shown in Figs. 5 through 7 by retaining the frame 62 in its downward position as shown in Fig. 6, and lifting the basket out of the slots 81. The rear or back sides of the baskets rest against, and are supported by, the frame 62 as indicated at 85 in Fig. 7.

Since certain changes may be made in the embodiments of the invention shown in the accompanying drawings, and described above in connection therewith, and different embodiments of the invention may be made without departing from the spirit and scope of the invention, all matter described above or shown in the drawings is intended to be interpreted as illustrative and not in a limiting sense.

What is claimed as new is:

1. A basket-supporting carriage adapted for use in self-service stores and comprising, in combination, a frame structure including a base portion and an upright portion, a basket-supporting rest to which the rear side of a basket may be attached, connection means for pivotally connecting said rest to said frame upright portion whereby said rest is rotatable from a downward position to an upward position, and spring means having a stationary end connected with said frame upright portion and movable end connected with said rest so as to bias said rest from its downward to its upward position, a basket supported on said rest being in the horizontal position when said rest is in its downward position, and being in its vertically tilted position when said rest is in its upward position.

2. A basket-supporting carriage adapted for use in self-service stores and comprising, in combination, a frame structure including a base portion and an upright portion, said upright portion including a pair of upright side members interconnected at the top by a transverse handle member, a pair of spaced mounting brackets projecting forwardly from said handle member, a basket-supporting rest having horizontal mounting portions adjacent the upper edge which are pivotally connected with said brackets whereby said rest may be turned about a horizontal axis adjacent its upper edge, stop means on said frame upright portion limiting the downward pivoting of said rest so that when a basket is supported thereon it will be in a horizontal position, at least one coil spring mounted on one of said horizontal mounting portions having one end stationarily secured to the adjacent mounting bracket and having the other end attached to said rest so as to bias and hold said rest in its upwardly tilted position in which an empty basket supported on said rest is maintained in its vertically tilted position.

HAROLD I. SIDES.

REFERENCES CITED

The following references are of record in the file of this patent:

UNITED STATES PATENTS

| Number | Name | Date |
| --- | --- | --- |
| D. 156,701 | Concklin | Jan. 3, 1950 |
| 2,141,881 | Schray | Dec. 27, 1938 |
| 2,212,053 | Smith | Aug. 20, 1940 |
| 2,479,530 | Watson | Aug. 16, 1949 |